(12) United States Patent
Helmick et al.

(10) Patent No.: US 8,301,600 B1
(45) Date of Patent: Oct. 30, 2012

(54) FAILOVER RECOVERY IN A DISTRIBUTED DATA STORE

(75) Inventors: Michael T. Helmick, Seattle, WA (US); Jakub Kulesza, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 164 days.

(21) Appl. No.: 12/946,524

(22) Filed: Nov. 15, 2010

(51) Int. Cl.
*G06F 17/30* (2006.01)
(52) U.S. Cl. ........................ 707/648; 707/682
(58) Field of Classification Search ............... 707/609, 707/615, 623, 634, 648, 672, 682
See application file for complete search history.

(56) References Cited

U.S. PATENT DOCUMENTS

| | | | |
|---|---|---|---|
| 6,671,705 B1 * | 12/2003 | Duprey et al. | 1/1 |
| 7,155,638 B1 * | 12/2006 | Heideman et al. | 714/11 |
| 7,181,642 B1 * | 2/2007 | Heideman et al. | 714/6.1 |
| 7,506,117 B2 * | 3/2009 | Yamamoto et al. | 711/162 |
| 8,001,075 B2 * | 8/2011 | Doty et al. | 707/609 |
| 8,032,489 B2 * | 10/2011 | Villella et al. | 707/622 |
| 8,037,056 B2 * | 10/2011 | Naicken et al. | 707/711 |
| 2005/0022051 A1 * | 1/2005 | Zane et al. | 714/6 |
| 2005/0228834 A1 * | 10/2005 | Shinkai | 707/202 |
| 2006/0002292 A1 * | 1/2006 | Chang et al. | 370/225 |
| 2011/0125704 A1 * | 5/2011 | Mordvinova et al. | 707/600 |
| 2012/0069944 A1 * | 3/2012 | Hadzic et al. | 375/376 |

* cited by examiner

*Primary Examiner* — Cam-Linh Nguyen
(74) *Attorney, Agent, or Firm* — Thomas, Kayden, Horstemeyer & Risley, LLP

(57) ABSTRACT

Disclosed are various embodiments for failover recovery in a distributed data store. A computing device determines whether it is a master data store in a distributed data store. New data item updates are assigned the next transaction identifier in a gapless numbering scheme relative to the most durably persisted entry. New data item updates are also associated with a data store identifier that identifies the new master data store.

22 Claims, 6 Drawing Sheets

FAILOVER RECOVERY IN A DISTRIBUTED DATA STORE

BACKGROUND

A data store, such as, for example, a non-relational database, a relational database management system (RDBMS) or other data systems may be implemented as a distributed system. Distributed systems can offer improved reliability and availability, better fault tolerance, increased performance, and easier expansion. Some distributed models employ single-master replication, where data written to a master data store is replicated to one or more secondary stores. Distributed data stores may experience difficulties if the master data store fails.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to failover recovery in a distributed data store. In one embodiment, a distributed data store can employ a single-master replication model that provides for a master data store and one or more slave data stores. The master data store can accept and evaluate any updates to data items stored in the distributed data store received from client systems and use a replication log to facilitate propagation of updates to data items to slave data stores. Upon receiving an update and propagating the update to a requisite number of slave data stores, the master data store can then consider the update as successful, durable, and/or committed to the distributed data store. To provide data durability or integrity from a client or user point of view, any update to a data item acknowledged to the user as successful in a distributed data store according to embodiments of the disclosure should be able to survive the failure of the master data store. In such a scenario, a slave data store in the distributed data store can be designated as the new master data store. To provide such failover capability to the distributed data store, the new master data store, previously a slave data store, must be able to determine at least the last successful updates committed to the distributed data store and acknowledge as successful to a client in order to properly assume its role as the master.

Figure 1:
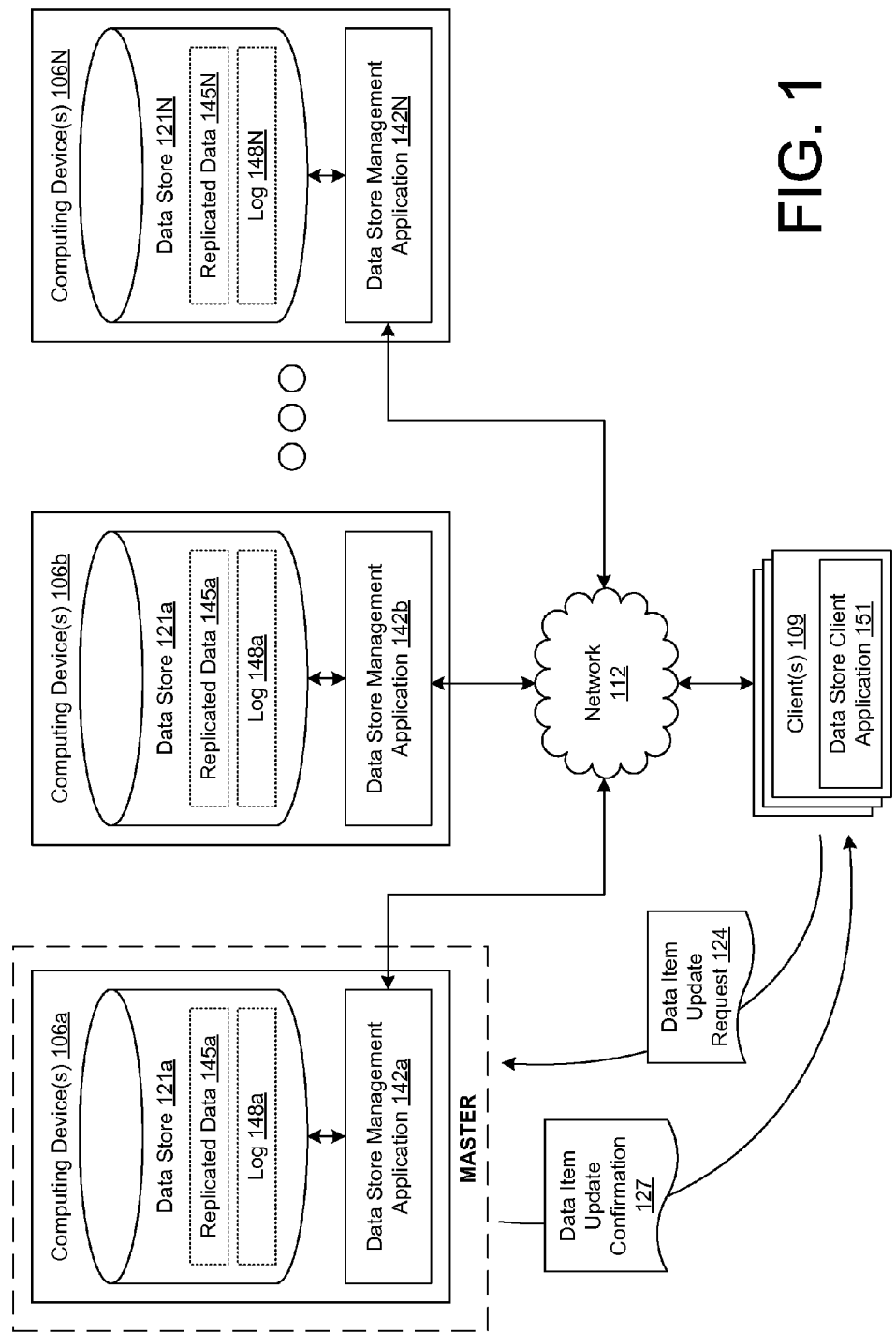
FIG. 1 is a drawing of a networked environment according to various embodiments of the present disclosure.

With reference to FIG. 1, shown is a networked environment 100 according to various embodiments. The networked environment 100 includes one or more computing devices 106a . . . 106N in communication with one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

Each of the computing devices 106a . . . 106N may comprise, for example, a server computer or any other system providing computing capability. Alternatively, a respective plurality of computing devices 106a . . . 106N may be employed that are arranged, for example, in one or more server banks or computer banks or other arrangements. For example, a plurality of computing devices 106a . . . 106N together may comprise a cloud computing resource, a grid computing resource, and/or any other distributed computing arrangement. Such computing devices 106a . . . 106N may be located in a single installation or may be distributed among many different geographical locations. For purposes of convenience, the computing device 106 is referred to herein in the singular. Even though the computing device 106 is referred to in the singular, it is understood that a plurality of computing devices 106a . . . 106N may be employed in the various arrangements as described above.

Various applications and/or other functionality may be executed in the computing device 106 according to various embodiments. Also, various data is stored in a respective data store 121a . . . 121N that is accessible to the computing device 106. The respective data store 121a . . . 121N may be representative of a plurality of data stores as can be appreciated. The data stored in the data store 121, for example, is associated with the operation of the various applications and/or functional entities described below. In a distributed data store model as described herein, any of the depicted computing devices 106 can be designated as a master data store, and, likewise, any of the data stores can be designated as a slave data store. Accordingly, these computing devices 106 can be disparately located to provide for greater stability of a distributed data store so that a catastrophic event occurring in one location that may affect a subset of the computing devices 106 in the distributed data store does not jeopardize the system as a whole.

The components executed on the computing device 106, for example, include a data store management application 142, and other applications, services, processes, systems, engines, or functionality not discussed in detail herein. When a computing device 106 is designated as a master data store for a distributed data store implemented by computing devices 106a . . . 106N, the data store management application 142 is executed to manage the data store 121 and to facilitate replication of data to one or more data stores 121 accessible to computing devices 106 that are designated as slave data stores. In a master data store, the data store management application 142 may obtain data item update requests 124 from the client 109 and respond with data item update confirmations 127. The data store management application 142 may also generate and send data item replication requests to the computing devices 106 and obtain data item replication confirmations from the computing devices 106.

In a computing device 106 designated as a slave data store, the data store management application 142 can receive data item replication requests from a master data store and cause the corresponding data item to be stored in the data store 121 managed by the slave data store. In other words, the data store management application 142, when a computing device 106 is designated as a slave data store, is configured to obtain data item replication requests from the master data store. In response to the data item replication requests, the data store management application 142 executed in a slave data store is configured to commit data item updates to its respective data store 121 and then generate and send data item replication confirmations to the master data store.

The data stored in a data store 121 includes, for example, replicated data 145, a log 148, and potentially other data. The replicated data 145 includes any data maintained in the data store 121 that can be durably persisted across a distributed data store implemented by the various computing devices 106 in the system. The log 148 includes a plurality of log entries that correspond to update transactions for various data items stored, or to be stored, in the replicated data 145. It should also be appreciated that log entries can correspond to new data items submitted by a client 109 that are created in the data store 121.

In this sense, each log entry can describe an intent to make a change to a data item in the distributed data store. As a non-limiting example, a log entry may describe a change of inserting a data item with a specified list of attribute values. As another non-limiting example, a log entry may describe a change of modifying one or more attribute values of an existing data item. As will be described in further detail herein, each log entry may be associated with a data store identifier from which a data store can deduce the identity of the master data store when the log entry was generated. Each log entry can also be associated with a transaction identifier to maintain ordering of update transactions regarding a data item. The transaction identifier may be defined, for example, by a sequence number that is one of a monotonically increasing sequence of integer values. The transaction identifier can also be defined, for example, as a gapless sequence identifier in a gapless sequence numbering scheme. The generating of data store identifiers as well as transaction identifiers and their use in facilitating failover of computing devices 106 acting as a master data store in a distributed data store is described in further detail herein.

The client 109 is representative of a plurality of client devices that may be coupled to the network 112. The client 109 may comprise, for example, a processor-based system such as a computer system. Such a computer system may be embodied in the form of a desktop computer, a laptop computer, a server computer, a cloud computing resource, a grid computing resource, or other devices or systems with like capability. The client 109 may be configured to execute various applications such as a data store client application 151 and/or other applications. The data store client application 151 may be executed in a client 109 to facilitate interaction with the data store management application 142. In one embodiment, the data store client application 151 may be configured, for example, to access and render network pages, such as web pages, or other network content served up by the computing device 106, and/or other servers for the purpose of interfacing with the data store management application 142.

In various embodiments, the data store client application 151 may comprise a thin client application, a thick client application, or another type of client application. Some embodiments may include a graphical user interface and/or a command-line interface. In some embodiments, the client 109 can be configured to interact with a distributed data store provided by the computing devices 106a . . . 106N via an application programming interface (API) provided by the data store management application 142 executed in a master data store or slave data store.

A data item update request 124 is generated by a data store client application 151. Although the data store client application 151 is described as executed in a client 109, it is understood that the client 109 may correspond to a server computer that processes business logic, generates network pages, and/or performs other tasks. Thus, although a user may generate a data item update request 124 through a user interface, a data item update request 124 may also be generated automatically by business logic applications, workflow engines, network page generation applications, and/or other applications.

The data store client application 151 may correspond to a portion of another application, such as, for example, a module, a library, etc. in various embodiments. The data item update request 124 may be sent over the network 112 to the data store management application 142 using hypertext transfer protocol (HTTP), simple object access protocol (SOAP), remote procedure call (RPC), remote method invocation (RMI), and/or other protocols. In various embodiments, the data item update request 124 may describe updates to data items by using, for example, structured query language (SQL), extensible markup language (XML), JavaScript object notation (JSON), yet another markup language (YAML), and/or other formats.

Next, a general description of the operation of the various components of the networked environment 100 is provided. As described above, in a distributed data store according to embodiments of this disclosure, any of the computing devices 106 in such a distributed system can be designated as a master data store, with the remaining computing devices being designated as slave data stores. One objective of such a distributed system is data redundancy, as data items stored in the data store can be mirrored across one or more of the slave data stores in the system. Additionally, embodiments of the present disclosure can provide failover capability in the event of a failure or other malfunction of a computing device 106 designated as a master data store.

In a distributed data store employing single-master replication, updates are directed to and processed by a designated master data store that is in communication with at least one slave data store. The computing device 106 that is designated as a master data store can be elected by consensus of the various computing devices 106a . . . 106N in the distributed system. In some embodiments, the data store management application 142a . . . 142N executed in the various computing devices 106 can be configured to collectively employ a Paxos election scheme in order to determine the identity of the computing device 106 that will serve as the master data store. The election of a master data store among the various computing devices 106 in the distributed data store can also be determined by other methods of reaching consensus in a distributed system of peers as can be appreciated. During election of the master data store in a distributed data store, a data store identifier that identifies the master data store can also be generated by the data store management application 142 executed in the elected master data store. In one embodiment, the data store identifier can be based at least upon a distributed logical clock that identifies the relative order of events occurring within the distributed data store. Such a logical clock can be employed in the framework of a Paxos election of a master data store, and can, in one embodiment, simply be adopted as the data store identifier identifying the master data store. In another embodiment, the Paxos transition associated with the election of the master data store can be adopted Additionally, when applying changes or updates to a data item in a distributed data store that can employ a single master replication scheme and that is implemented by the computing devices 106 the data item update can be presented to a computing device 106 designated as the master data store. Accordingly, the master data store can replicate changes associated with the update to at least one slave data store. The changes associated with an update transaction are propagated to the slave data stores by way of log entries that can be embedded within data item replication requests generated by the master data store and transmitted to the slave data stores. The data store management application 142 executed in a slave data store is configured to commit the changes described by the log entries embodied in the data item replication requests from a master slave data store to the respective data store 121 in an order according to the transaction identifiers associated with the log entries. The log entries can also be associated with a data store identifier, and both the transaction identifier and data store identifier associated with each log entry is employed to facilitate failover recovery, as will be described below.

In the distributed data store, the replicated data 145 in a slave data store is configured to mirror the replicated data 145 in the master data store. The data store management application 142 may also be configured to save the log entries to the log 148 to facilitate rollback of committed updates if necessary. When one or more of the slave data stores respond to the data store management application 142 executed in the master data store confirming that a change has been committed in their respective data stores 121, the data store management application 142 executed in the master data store can determine that the change has been made durably persistent in the distributed data store. In some embodiments, the master data store can determine that a change has been made durably persistent when a predetermined number of slave data stores, or a requisite quorum of slave data stores, have confirmed receipt of an update to a data item in the distributed data store, at which point the master data store can issue a command to the slaves that the update be committed. Accordingly, the master data store can then provide a data item update confirmation 127 to a data store client application 151. If an appropriate quorum has not been reached, the data store management application 142 associated with a master data store can respond to a data store client application 151 with an error.

Figure 2:
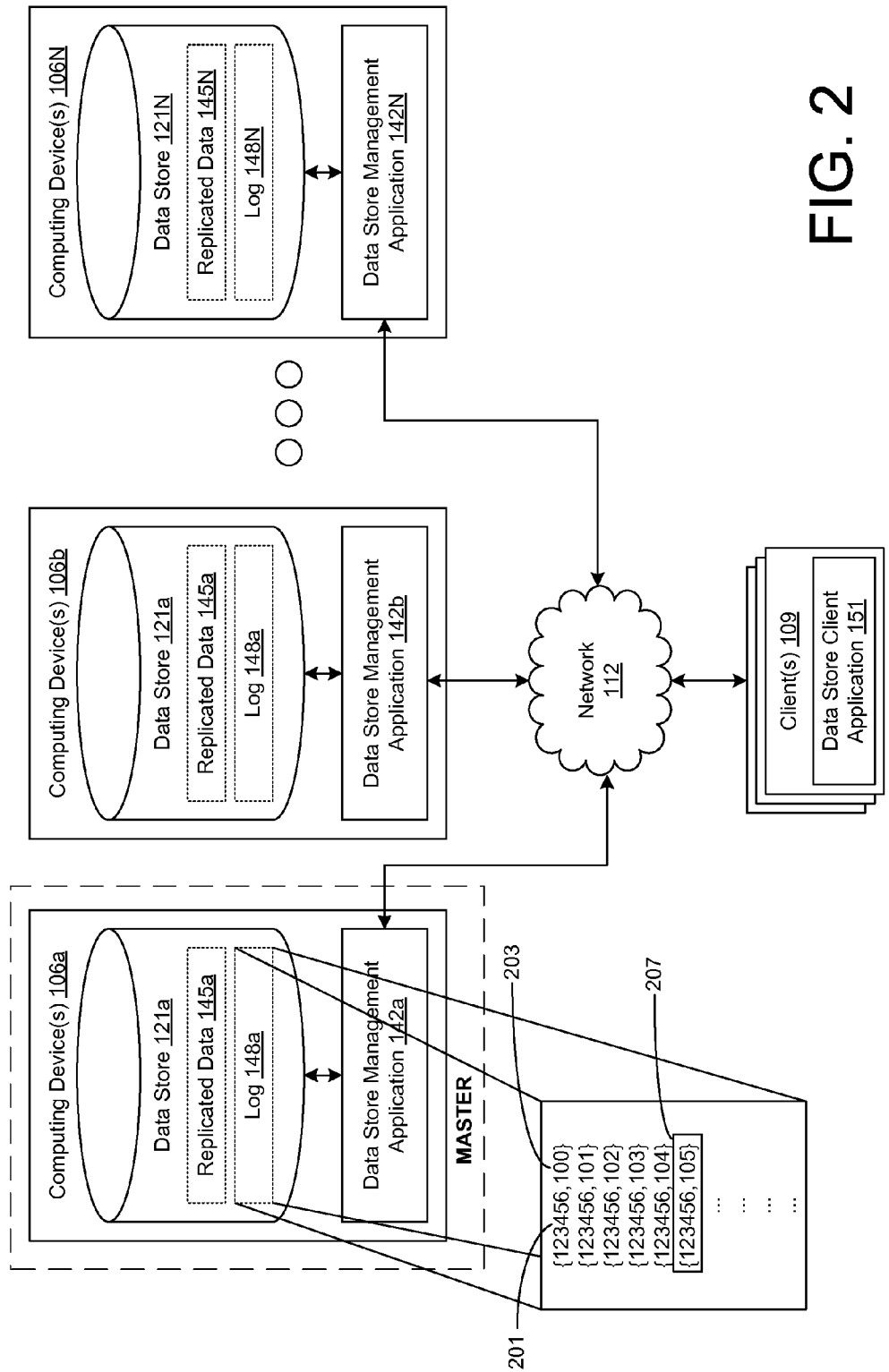
FIGS. 2-4 are drawings of an example of failover recovery of a distributed data store implemented by computing devices in the networked environment of FIG. 1 according to various embodiments of the present disclosure.
Figure 3:
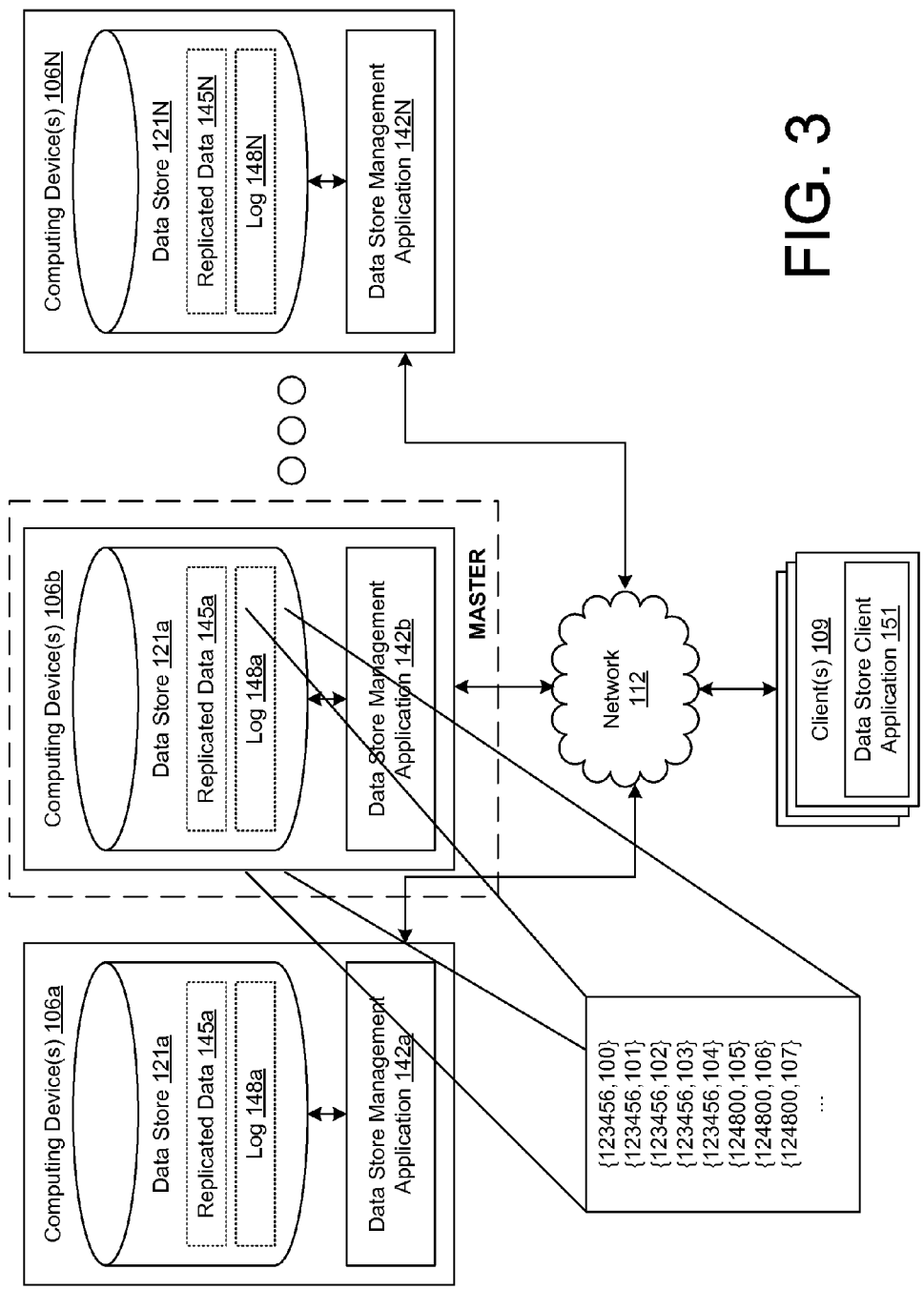
Figure 4:
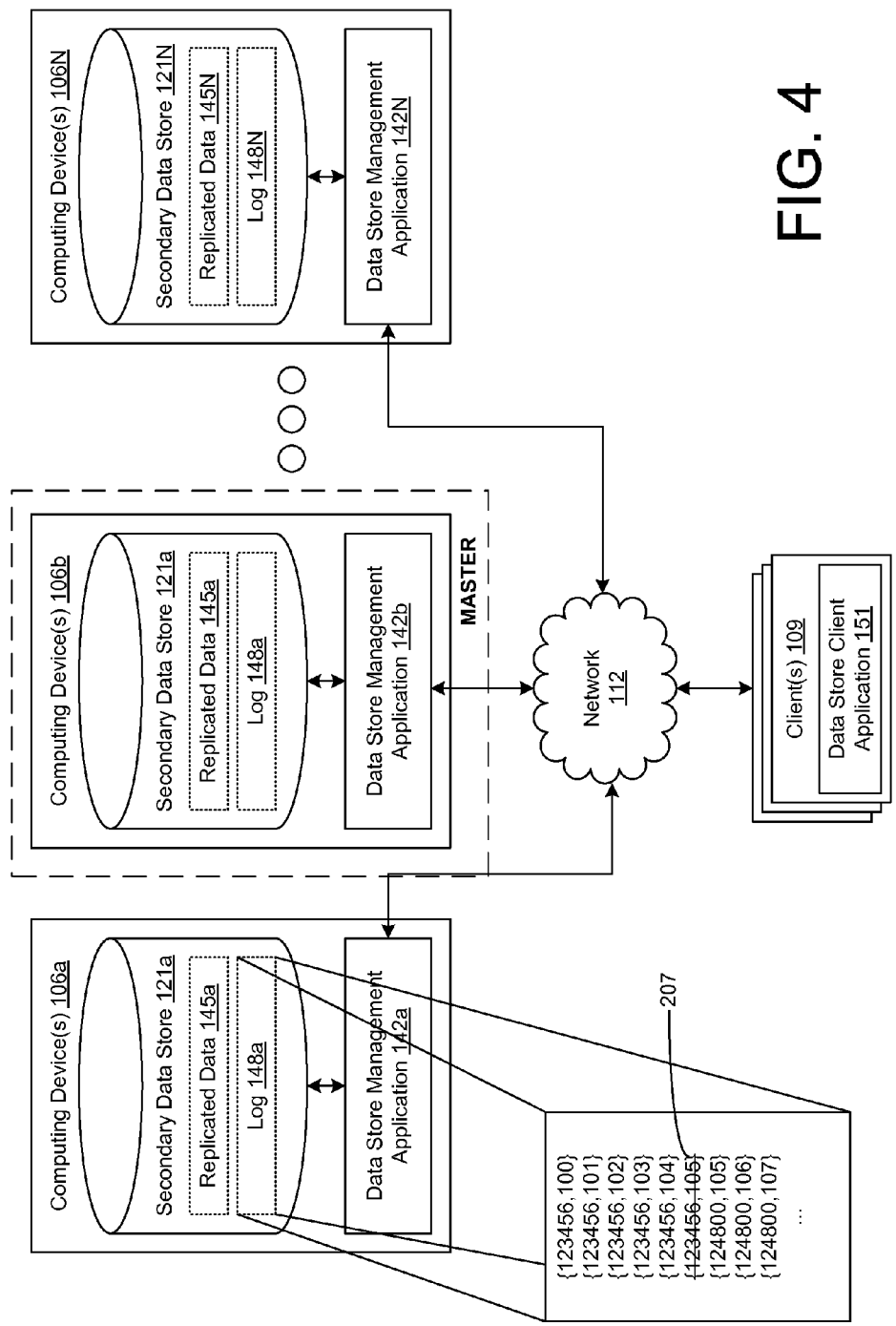

Reference is now made to FIGS. 2-4, which illustrate one example of failover in a distributed data store, and how the data store management application 142 executed in the various computing devices 106 in the networked environment to maintain synchronization of replicated data 145 upon election of a new master data store. FIG. 2 illustrates a master data store designated by computing device 106a that can log data item updates in the log 148 associated with the data store 121. In the depicted non-limiting example, the each log entry can include data regarding changes to be made to data in the data store 121 (not shown). Additionally, each log entry can be associated with a tuple that includes a data store identifier 201 and a transaction identifier 203 that can uniquely identify the sequence of data item updates as described above. In the depicted example, the data store identifier 201 can be based upon a logical clock used to identify the master data store in a Paxos election scheme. Accordingly, the data store identifier 201 associated with log entries can remain constant until a new master data store is elected (e.g., in a failover scenario).

In the depicted example, the log contains entries corresponding to data item updates that the data store management application 142 of the master data store has identified as being replicated among a predetermined number, or a quorum, of slave data stores. Therefore, these log entries, like the data item updates, are replicated among at least a predetermined number of slave data stores in the distributed data store. Log entry 207 is associated with a data item update that the master data store has attempted to replicate among a quorum of slave data stores. However, log entry 207 and the replication attempt has not been acknowledged by a quorum of slave data stores in the distributed data store. Accordingly, the master data store does not issue a command to the slave data stores to commit the data item update associated with log entry 207. If, before acknowledgement from a quorum of slave data stores, the master data store fails, a client application 151 interacting with the master data store will not receive confirmation that the data item update was successful. Additionally, if the master data store fails before the log entry 207 can be removed from the log and/or the associated data item update rolled back, the log entry 207 may remain in the log when the master data store rejoins the distributed data store as a slave data store.

Accordingly, reference is now made to FIG. 3, which continues the example of FIG. 2. In FIG. 3, assume, for the purposes of illustration, that the previous master data store, represented by computing device 106a, has failed in some way. A failure can be represented by a hardware failure of some kind, an abnormal termination of the data store management application 142a, and/or other failure as can be appreciated. Therefore, the remaining computing devices 106 executing an instance of the data store management application 142 can elect a new master data store by employing a consensus algorithm as described above. In the depicted example, the computing device 106b is elected as the new master data store.

To accomplish failover upon failure of the previous master data store, the new master data store can determine a most recent log entry by identifying such an entry in its own log. In some embodiments, the new master data store can consult a quorum of slave data stores in the distributed data store and determine the most recent entry committed to a quorum of respective logs in the slave data stores by the previous master data store. As one non-limiting example, the new master data store can identify a log entry having the highest transaction identifier in a quorum of slave data stores. Such a determination identifies the most recent log entry that the previous master data store could have considered committed to the distributed data store.

In other words, the new master data store determines the end of log. The end of log includes an entry with a data store identifier identifying the previous master as well as a transaction identifier identifying the last update that was committed to the distributed data store by the previous master data store. Accordingly, when the data store management application 142b in the new master data store receives a new data item update from a data store client application 151, it can generate a new data store identifier that can be employed for the new data item updates as well as future updates for which it is the master data store. The new data item update can be associated with the data store identifier as well as a transaction identifier representing the next in the sequence of a gapless sequence numbering scheme relative to the transaction identifier of the most recent entry in its log 148b. As described above, the data store management application 142b can then replicate the data item update and corresponding log entry to at least a quorum of the slave data stores in the distributed data store.

Reference is now made to FIG. 4, which continues the example of FIGS. 2 and 3. In the example of FIG. 4, the computing device 106a, which was previously a master data store, has rejoined the distributed data store as a slave data store. As described above with reference to FIG. 2, log entry 207 was not durably persisted in a sufficient quorum of data stores 121 in the distributed data stores prior to failure of the computing device 106a in its capacity as the previous master data store. Accordingly, the now slave data store represented by computing device 106a can receive data item updates as well as corresponding log entries from the new master data store represented by computing device 106b. As shown in FIG. 4, one of the data item updates received from new master data store is associated with a transaction identifier that conflicts with the transaction identifier corresponding to log entry 207.

In one embodiment, because the generation of a data store identifier can be based upon an always increasing number relative to the data store identifier associated with a previous master, a slave data store in a scenario such as illustrated in FIG. 4 can determine whether such a conflicting entry was overwritten by a newly elected master data store elsewhere in the distributed data store. This determination can be made because the data store identifier associated with the log entry will be greater than the data store identifier associated with a log entry such as the one represented by log entry 207. Accordingly, in the depicted example of FIG. 4, the slave data store computing device 106a can determine that the data item update associated with log entry 207 was not durably persisted in the distributed data store and roll back the transaction associated with the log entry 207 in its data store 121a.

Figure 5:
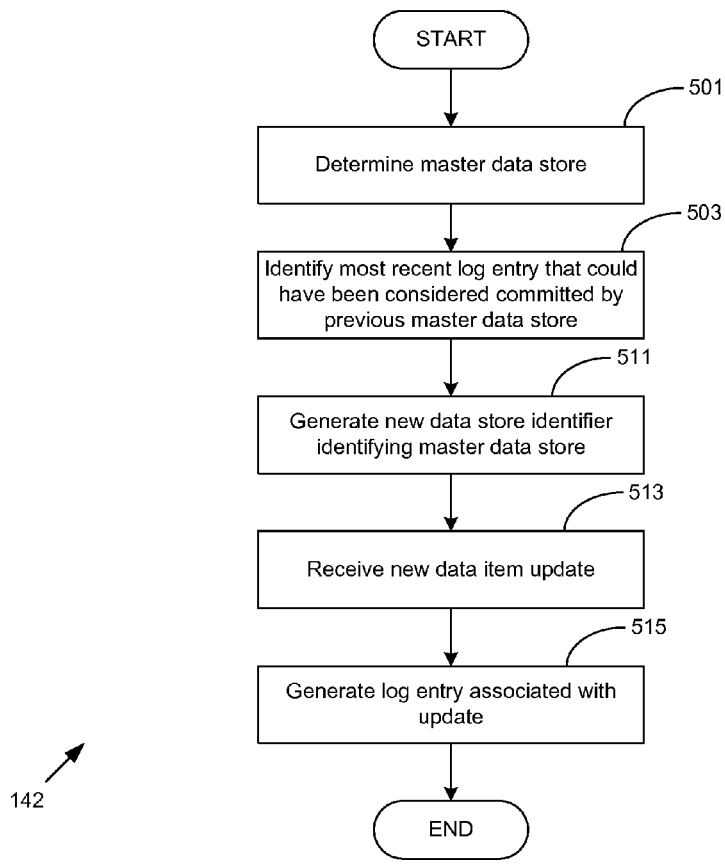
FIG. 5 is a flowchart illustrating one example of functionality implemented as portions of data store management application executed in a computing device in the networked environment of FIG. 1 according to various embodiments of the present disclosure.

Referring next to FIG. 5, shown is a flowchart that provides one example of the operation of a portion of the data store management application 142 according to various embodiments. It is understood that the flowchart of FIG. 5 provides merely an example of the many different types of functional arrangements that may be employed to implement the operation of the portion of the data store management application 142 as described herein. As an alternative, the flowchart of FIG. 5 may be viewed as depicting an example of steps of a method implemented in the computing device 106 (FIG. 1) according to one or more embodiments.

Beginning with box 501, the data store management application 142 determines whether the computing device 106 in which it is executed has been designated as the master data store. As described above, upon failure of a master data store in a distributed data store, the remaining slave data stores can determine by employing a consensus algorithm a computing device 106 formerly acting as a slave data store that should be designated as the new master data store. Next, the data store management application 142 can identify the tail or end of log 148 that contains at least the most recent entry that could have been considered committed by the previous master data store in box 503. Next, in box 511, the data store management application 142 can generate a new data store identifier, which can be used to identify the identity of the master data store among the computing devices 106 in the distributed data store. As described above, the data store identifier can be based upon a logical clock employed to facilitate election of the new master data store.

In box 513, the data store management application 142 can receive a new update to a data item in the distributed data store. Accordingly, in box 515, the data store management application can generate a new log entry associated with the new update. The new log entry can be associated with the new data store identifier as well as a transaction identifier that represents the next entry in a gapless numbering scheme relative to the most recent durably persisted log entry. The log entry and data item update can then be replicated among the slave data stores in the distributed data store.

Figure 6:
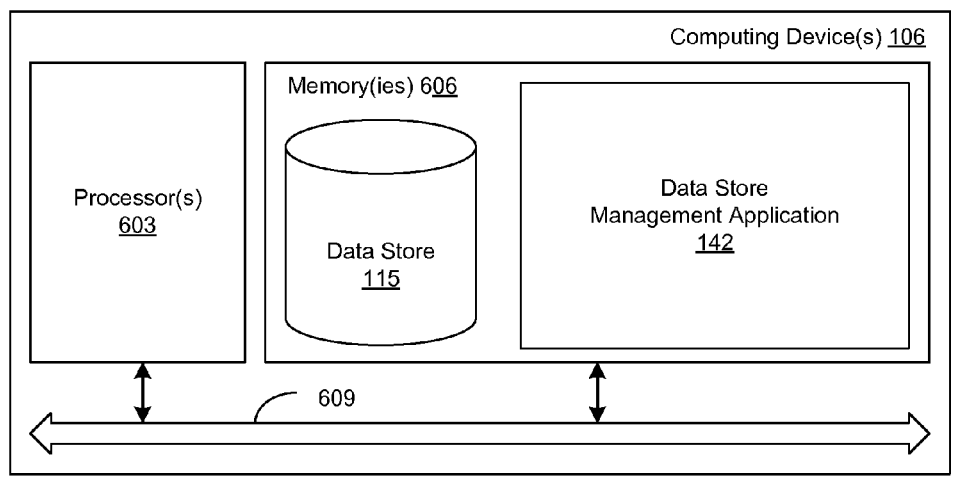
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the data store management application 142 and potentially other applications. Also stored in the memory 606 is the primary data store 115 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 112 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the data store management application 142 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the data store management application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data store management application 142, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
   code that determines by consensus with other computing devices in a distributed data store whether the computing device is designated as a master data store;
   code that retrieves a most recent log entry of a log associated with the computing device;
   code that determines whether the most recent log entry is durably persisted in a quorum of slave data stores in the distributed data store;
   code that generates a new data store identifier, the new data store identifier identifying the identity of the master data store;
   code that generates a new log entry associated with an update to a data item that is received by the master data store, the new log entry comprising a next transaction identifier in a gapless sequence and the new data store identifier; and
   code that replicates the update and the new log entry to the slave data stores.

2. The non-transitory computer-readable medium of claim 1, wherein the code that determines whether the most recent log entry is durably persisted in a quorum of slave data stores further comprises code that identifies a highest transaction identifier associated with log entries in a quorum of slave data stores.

3. A system, comprising:
   a master data store;
   a plurality of slave data stores; and
   a data store management application executable in at least one of the master data store and the slave data stores, the data store management application comprising:
   logic that receives an update to a data item that is to be applied to a distributed data store facilitated by the master data store and the slave data stores;
   logic that applies the update to the master data store;
   logic that generates a log entry corresponding to the update in the master data store, the log entry comprising a data store identifier and a transaction identifier;

logic that replicates the update to the slave data stores; and logic that replicates the log entry to corresponding logs in the slave data stores.

4. The system of claim 3, wherein the data store management application further comprises:

logic that, when the master data store is unavailable to continue acting as a master of the distributed data store, determines that one of the slave data stores is a new master data store;

logic that determines a most recent log entry in a data store; and logic that generates a new data store identifier identifying the new master data store as the master of the distributed data store.

5. The system of claim 4, wherein the new data store identifier is greater than the data store identifier.

6. The system of claim 4, wherein the new data store identifier is generated such that the data store management application can determine that the new data store identifier was generated after the data store identifier.

7. The system of claim 4, wherein the logic that determines that one of the slave data stores is the new master data store further comprises logic that consults at least a quorum of the slave data stores.

8. The system of claim 7, wherein the quorum is a predetermined threshold of slave data stores in the distributed data store.

9. The system of claim 4, wherein the data store management application further comprises:

logic that receives a new update to a data item that is to be applied to the distributed data store;

logic that applies the new update to the new master data store;

logic that generates a new log entry corresponding to the new update in the new master data store, the new log entry comprising the new data store identifier and a new transaction identifier;

logic that replicates the new update to a remainder of the slave data stores; and logic that replicates the new log entry to corresponding logs in the slave data stores.

10. The system of claim 9, wherein the new transaction identifier being is next in a gapless sequence relative to a transaction identifier associated with the most recent log entry.

11. The system of claim 9, wherein the master data store rejoins the distributed data store as a new slave data store, and the data store management application executed in the new slave data store further comprises:

logic that synchronizes a log in the new slave data store with a log in the new master data store; and logic that rolls back at least one data item update associated with at least one log entry in the log in the new slave data store having a transaction identifier that is the same as a log entry in the new master data store.

12. The system of claim 4, wherein the new data store identifier is based at least upon a logical clock maintained in the distributed data store, the logical clock expressing a relative sequence of events among a plurality of computing devices comprising the distributed data store.

13. A method, comprising the steps of:

determining, in at least one computing device, that the at least one computing device is a master data store that is a member of a distributed data store, the distributed data store having a plurality of slave data stores;

identifying, in a log associated with the master data store, a most recent entry in the log, the most recent entry associated with a first data store identifier, wherein the first data store identifier identifies a previous master data store;

generating, in the at least one computing device, a second data store identifier.

14. The method of claim 13, wherein the step of determining that a data store implemented in the at least one computing device is a master data store further comprises the step of executing a consensus algorithm among a plurality of computing devices in the distributed data store.

15. The method of claim 13, wherein the most recent entry is associated with a transaction identifier that identifies a most recent update to a data item replicated among a predetermined number of the slave data stores.

16. The method of claim 13, further comprising the step of issuing, in the at least one computing device, a command to the slave data stores to discard the at least one data transaction corresponding to log entries more recent than the durable entry.

17. The method of claim 16, further comprising the step of confirming, in the at least one computing device, that the distributed data store is synchronized when a confirmation is obtained from the at least a predetermined number of the slave data stores.

18. The method of claim 13, further comprising the steps of:

receiving, in the at least one computing device, an update to a data item that is to be applied to the distributed data store;

applying, in the at least one computing device, the update to the data item in the master data store;

appending, in the at least one computing device, a log entry corresponding to the update to the log corresponding to the master data store, the log entry being associated with the second data store identifier;

replicating, in the at least one computing device, the update to at least the predetermined number of the slave data stores;

replicating, in the at least one computing device, the log entry to respective logs for each of the predetermined number of the at least one secondary data store.

19. The method of claim 18, further comprising the steps of:

generating, in the at least one computing device, a transaction identifier associated with the update; and associating the log entry with the transaction identifier.

20. The method of claim 19 wherein the transaction identifier is based at least upon a gapless sequence maintained between data stores comprising the distributed data store, the gapless sequence expressing an order of updates to data items applied to the distributed data store.

21. The method of claim 13, wherein the second data store identifier is based at least upon a logical clock maintained between data stores comprising the distributed data store, the logical clock based at least upon a sequence of events within the distributed data store.

22. The method of claim 13, wherein the second data store identifier uniquely identifies a data store in the distributed data store.

* * * * *